United States Patent
Yoshida et al.

(10) Patent No.: US 7,272,088 B2
(45) Date of Patent: Sep. 18, 2007

(54) INFORMATION RECORDING APPARATUS AND OPTIMUM RECORDING LASER POWER DETECTING METHOD

(75) Inventors: Masayoshi Yoshida, Tokorozawa (JP); Takeshi Koda, Tokorozawa (JP); Keiji Katata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 584 days.

(21) Appl. No.: 10/914,307

(22) Filed: Aug. 10, 2004

(65) Prior Publication Data

US 2005/0036415 A1   Feb. 17, 2005

(30) Foreign Application Priority Data

Aug. 11, 2003  (JP)  ............... 2003-207116

(51) Int. Cl.
*G11B 7/00* (2006.01)

(52) U.S. Cl. ............... 369/47.51; 369/47.53; 369/47.54

(58) Field of Classification Search ............ 369/116, 369/120, 121, 122, 47.5, 47.51, 47.52, 47.53, 369/47.54

See application file for complete search history.

(56) References Cited

U.S. PATENT DOCUMENTS 6,327,240 B1 * 12/2001 Tobita et al. ............ 369/53.19

FOREIGN PATENT DOCUMENTS

| EP | 0 743 636 | 11/1996 |
|---|---|---|
| JP | 2000-251257 | 9/2000 |
| JP | 3159454 | 2/2001 |
| JP | 2002-25068 | 1/2002 |
| JP | 2002-74667 | 3/2002 |
| JP | 2002-352517 | 12/2002 |

\* cited by examiner

*Primary Examiner*—Nabil Hindi
(74) *Attorney, Agent, or Firm*—Young & Thompson

(57) ABSTRACT

An information recording apparatus records the record data onto an information recording medium, which is provided with wobbled tracks and on which pre-format address information is recorded. The information recording apparatus is provided with: an optical pickup; a detector for detecting a push-pull signal on the basis of an output of the optical pickup; a timing generator for generating a timing signal by detecting the pre-format address information and by detecting a slot unit smaller than a data management unit of the pre-format address information on the basis of a cycle of the push-pull signal; and a system controller for detecting an optimum recording laser power by recording or reproducing a test signal on the tracks while changing a recording laser power on the basis of the timing signal.

3 Claims, 11 Drawing Sheets

INFORMATION RECORDING APPARATUS AND OPTIMUM RECORDING LASER POWER DETECTING METHOD

BACKGROUND OF THE INVENTION

1. Field of the Invention

The present invention relates to an information recording apparatus, such as a write-once-type optical disc recorder, for recoding information onto an information recording medium, such as a write-once-type optical disc, and an optimum recording laser power detecting method which is executed on such an information recording apparatus.

2. Description of the Related Art

For example, on an information recording/reproducing apparatus for recording information onto an information recording medium, such as an optical disc, the optimum recording power of a laser beam is set by Optimum Power Control (OPC) processing according to the type of the optical disc, the type and the recording speed of the information recording/reproducing apparatus, and the like. Namely, the calibration of the recording laser power (i.e., the calibration of the recording power of the laser beam) is performed. This corresponds to variations in characteristics of an information recording surface of the optical disc. For example, if the optical disc is inserted or loaded and a command of writing is inputted, light intensity is changed sequentially step-by-step and the data for trial writing is recorded into a Power Calibration Area (PCA), by which so-called trial writing is performed. After that, the data for trial writing recorded in this manner is reproduced. The reproduction result is judged by a predetermined evaluation standard, and the optimum recording laser power is set.

More specifically, for example, in the case of a DVD-R (DVD-Recordable), the PCA (i.e., the OPC area, or the recording area for OPC) is provided with about 400 clusters, for example. One cluster is equivalent to 16 sectors, for example. Here, the "cluster" is a data management unit on a disc-shaped memory device and the smallest unit upon error-correcting. On the other hand, the "sector" is the smallest data management unit by pre-format address information in which the record data is error-correctable. One sector is equivalent to 26 sync frames, and one sync frame (hereinafter referred to as SF as occasion demands) is formed from a pre-pit which is the smallest unit of an address structure. The one SF is regarded as a unit of a power-step in one OPC processing, for example. Using the unit of the power-step, if the one OPC processing is provided with 26 power-steps, for example, the shortest pit length, 3T, and the longest pit length, 11T, of an 8/16 modulated test signal are recorded with respect to 26 SF with 26-stage laser powers, and the OPC processing is performed. Here, "T" is a standard clock cycle. For example, in the case of the DVD-R, 0.133 (μm)/3.49 (m/s)=about 38.2 (ns). Namely, the 26 SF (i.e. one sector) are used in the one OPC processing. With respect to each SF, an "OPC pattern", which is a predetermined pattern including a plurality of recording pits for trial writing (i.e. OPC pits), is recorded for each power-step. At this time, by setting the number of the power-steps used for the one OPC processing to be equal to or less than the number of the sync frames included in one sector, it is possible to perform the one OPC processing with the one sector. Therefore, for example, in one disc or one PCA provided for the one disc, it is possible to perform about 6400 times of OPC processing corresponding to the cluster total number (about 400 clusters). Incidentally, in this case, one cluster is equivalent to 16 sectors, but how many sectors the one cluster is equivalent to is various depending on the type of the medium. The above technique is disclosed in Japanese Patent NO. 3159454, and Japanese Patent Application Laying Open NO. 2002-352517.

However, according to the above-described technique, if the recording medium is a so-called write-once-type recording medium, for example, a write-once-type optical disc, such as the DVD-R, rewriting is not performed in the PCA because it uses the data management unit of the pre-format address (sector) information, which is an accessible unit, and because the unit corresponding to the sector is large in a large-capacity medium. This causes such a problem that the number of the OPC processing is limited by the size of the data management unit of the pre-format address information in the PCA. Particularly, with respect to a larger-capacity write-once-type recording medium, the chance or the number of writing-once or additional recording for one medium increases, so that the number of the OPC processing increases. As a result, if the OPC processing is executed as conventionally performed, the PCA is possibly used up before recording is performed onto an entire recording area, which is a technical problem.

SUMMARY OF THE INVENTION

It is therefore an object of the present invention to provide an information recording apparatus which enables an information recording medium, such as the write-once-type optical disc, to perform the OPC processing more times, and a method of detecting the optimum recording laser power which is executed on such an information recording apparatus.

(Information Recording Apparatus)

The above object of the present invention can be achieved by an information recording apparatus for recording record data onto an information recording medium which is provided with wobbled tracks and on which pre-format address information is recorded, the information recording apparatus provided with: an optical pickup device for irradiating a laser beam onto the tracks and receiving a reflected light thereof; a detecting device for detecting a push-pull signal on the basis of an output of the optical pickup device; a timing generating device for generating a timing signal by detecting the pre-format address information and by detecting a slot unit smaller than a data management unit of the pre-format address information on the basis of a cycle of the push-pull signal; and an optimum-laser-power-detecting device for detecting an optimum recording laser power by recording or reproducing a test signal on the tracks while changing a recording laser power on the basis of the timing signal.

According to the information recording apparatus of the present invention, at first, when the information recording medium is inserted or loaded, a seek operation is performed by the optical pickup device, and the data which is reproduced on a decoder is obtained. By this, various data for management, which is necessary for various processing of the information recording medium, is obtained. On the basis of the data for management, information recording medium is accessed according to an instruction from a host device or a backend or the like.

Following this processing or if a command of writing is inputted from the host device or the like, the optical pickup device moves to the PCA (i.e., the OPC area or the recording area for OPC), and the recording laser power is changed sequentially step-by-step under the control of the optimum-laser-power-detecting device, which causes the OPC pattern to be recorded into the PCA.

Incidentally, in the specification, the "test signal" associated with the present invention is defined by categorizing it to the "OPC pits" and the "OPC pattern". More specifically, the recording pits written on a trial basis into the PCA to detect the optimum recording laser power is referred to as the "OPC pits" as occasion demands. Then, a pit pattern which is recorded in one power-step (i.e. by using the constant recording laser power) for the OPC processing and which usually includes a plurality of OPC pits is referred to as the "OPC pattern" as occasion demands. Namely, in the case of recording in n power-steps (n: natural number) in one OPC processing, n OPC patterns are recorded one by one, by using different recording laser powers into n recording frames described later.

The operation upon recording in the OPC processing will be explained more specifically. Firstly, the detecting device detects the push-pull signal for indicating a wobble signal and output it to the timing generating device, on the basis of an output signal corresponding to the amount of the received laser light from a detector, which is disposed in the optical pickup device, for receiving a reflected light beam.

The timing generating device detects absolute position information which uses the pre-format address information indicated by the land pre-pit PP, i.e., a data management unit of an ADIP (Address In Pre-groove) word as a reference, from the push-pull signal for indicating the wobble signal outputted to the timing generating device from the detecting device, upon recording the OPC pattern in the OPC processing. At the same time, the timing generating device detects relative position information which uses the slot unit smaller than the data management unit of the ADIP word, e.g., a slot unit corresponding to a length which is N times as long as one cycle of a wobble signal of 28 wbs described later (N: natural number) as a reference, on the basis of the cycle of the push-pull signal for indicating the wobble signal. Thus, regardless of whether or not a recording start position in the OPC processing starts from the data management unit of the pre-format address information, i.e. from the boundary of each ADIP word, the timing generating device is capable of specifying the recording start position. Then, the timing generating device generates and outputs a timing signal for writing the OPC pattern, on the basis of the cycle of the push-pull signal for indicating the wobble signal outputted from the detecting device.

Thus, on the basis of the outputted timing signal for writing, the recording laser power is changed sequentially step-by-step under the control of the optimum-laser-power-detecting device, and the OPC pattern is recorded.

After such trial writing of the OPC pattern into the PCA is completed, the OPC pattern written on a trial basis is reproduced under the control of the optimum-laser-power-detecting device. The reproduced OPC pattern is sampled sequentially, and the optimum recording laser power is detected.

More specifically, at first, the timing generating device detects the push-pull signal for indicating the wobble signal and output it to the timing generating device, on the basis of the output of the detector, which is disposed in the optical pickup device, for receiving a reflected light.

The timing generating device is capable of specifying a reproduction start position by synchronously detecting the relative position information which uses the slot unit as a reference, upon reproducing the OPC pattern in the OPC processing, in the same manner as upon recording. Then, the timing generating device generates and outputs a timing signal for sampling the reproduced OPC pattern, on the basis of the cycle of the push-pull signal for indicating the wobble signal outputted from the detecting device.

Thus, on the basis of the timing signal for sampling, the reproduced OPC pattern is sequentially sampled under the control of the optimum-laser-power-detecting device, and the optimum recording laser power is detected.

Incidentally, in the normal case of writing-once or additional recording, at first, the optical pickup device is moved to the recording area. Then, the data is written once into the recording area by modulating the laser beam according to the data with the optimum recording laser power. Thus, the recording pits according to the data are formed onto the tracks.

Consequently, it is possible to adjust and match the timing between the recording and the reproducing of the OPC pattern, with one cycle of the wobble signal of the groove tracks as a reference. As a result, even if the OPC pattern is recorded or reproduced at the timing based on the slot unit smaller than the data management unit of the ADIP word of the pre-format address information indicated by the land pre-pits, i.e. the management unit smaller than the cluster or the sector, it is possible to perform the OPC processing highly accurately regardless of the eccentricity of the disc or the like.

Even if, e.g., a predetermined rotation angle and a predetermined rotation time associated with the disc, which are unrelated to one cycle of the wobble signal, may be used to adjust and match the timing between the recording and the reproducing of the OPC pattern, it may be possible to record the OPC pattern by using the management unit smaller than the cluster or the sector. However, since the width of a reproduction time axis is displaced to some extent which is unignorable with respect to an absolute time because of the eccentricity of the disc, for example, it is difficult or impossible in practice to adjust and match the timing between the recording and the reproducing of the OPC pattern. As a result, the detection accuracy of the OPC pattern is insufficient, so that it is difficult or impossible in practice to appropriately perform the OPC processing.

On the contrary, the information recording apparatus of the present invention is capable of performing the OPC processing highly accurately regardless of the eccentricity of the disc or the like, even if the OPC pattern is recorded by the slot unit smaller than the cluster or the sector, as described above. Particularly, if an entire data capacity is small as in the case of the conventional CD-R, the total number of the OPC processing is about 100, which is considered to be sufficient in practice. However, in the case of a larger capacity than that of the conventional CD-R, the number of the OPC processing which is performed increases. Therefore, such a construction that it is possible to perform the OPC processing relatively more times by using a relatively small PCA, as in the present invention, becomes more extremely useful in practice as the data capacity of the information recording medium increases.

In one aspect of the information recording apparatus of the present invention, the pre-format address information is an ADIP word unit, and the slot unit is N times as long as one cycle of a wobble signal smaller than the ADIP word (N: natural number).

According to this aspect, the slot unit can be set to an appropriate length according to the resolution in the practical band of the Analog to Digital (A/D) conversion on the information recording apparatus. Thus, it is possible to detect the optimum recording laser power more highly accurately.

(Optimum Recording Laser Power Detecting Method)

The above object of the present invention can be achieved by an optimum recording laser power detecting method of detecting an optimum recording laser power by recording a test signal onto an information recording medium which is provided with wobbled tracks and on which pre-format address information is recorded, the optimum recording laser power detecting method provided with: a light irradiating/receiving process of irradiating a laser beam onto the tracks and receiving a reflected light thereof; a detecting process of detecting a push-pull signal on the basis of an output of the light irradiating/receiving process; a timing generating process of generating a timing signal by detecting the pre-format address information and by detecting a slot unit smaller than a data management unit of the pre-format address information on the basis of a cycle of the push-pull signal; and an optimum-laser-power-detecting process of detecting an optimum recording laser power by recording or reproducing a test signal on the tracks while changing a recording laser power on the basis of the timing signal.

According to the optimum recording laser power detecting method of the present invention, it is possible to adjust and match the timing between the recording and the reproducing of the OPC pattern, by the light irradiating/receiving process, the detecting process, and the timing generating process, with one cycle of the wobble signal of the groove tracks as a reference.

As a result, even if the OPC pattern is recorded or reproduced by the optimum-laser-power-detecting process at the timing based on the slot unit smaller than the data management unit of the ADIP word of the pre-format address information indicated by the land pre-pits, i.e. the management unit smaller than the cluster or the sector, it is possible to perform the highly accurate OPC processing, i.e. the highly accurate detection of the optimum recording laser power, regardless of the eccentricity of the disc or the like.

The nature, utility, and further features of this invention will be more clearly apparent from the following detailed description with reference to preferred embodiments of the invention when read in conjunction with the accompanying drawings briefly described below.

As explained above, according to the information recording apparatus of the present invention, since it is provided with: the optical pickup device; the detecting device; the timing generating device; and the optimum-laser-power-detecting device, it is possible to detect the optimum recording laser power highly accurately. Moreover, according to the optimum recording laser power detecting method of the present invention, since it is provided with: the light irradiating/receiving process; the detecting process; the timing generating process; and the optimum-laser-power-detecting process, it is possible to detect the optimum recording laser power highly accurately.

DETAILED DESCRIPTION OF THE PREFERRED EMBODIMENTS (Information Recording Medium)

An embodiment of the information recording medium of the present invention will be explained with reference to FIG. 1 to FIG. 3 hereinafter.

Firstly, the basic structure of an optical disc in the embodiment will be explained with reference to FIG. 1 and FIG. 2. FIG. 1 shows the basic structure of an optical disc, which is one embodiment of an information recording medium used for the present invention, wherein the upper part is a substantial plan view of the optical disc having a plurality of recording areas, and the lower part, which corresponds to the upper part, is a schematic diagram of a recording area structure in the radial direction. FIG. 2 shows a recording surface of the optical disc in the embodiment.

The information recording medium associated with the embodiment is constructed from a write-once-type optical disc onto which information can be recorded only once by various destructive writing methods and from which the information can be reproduced many times.

Figure 1:
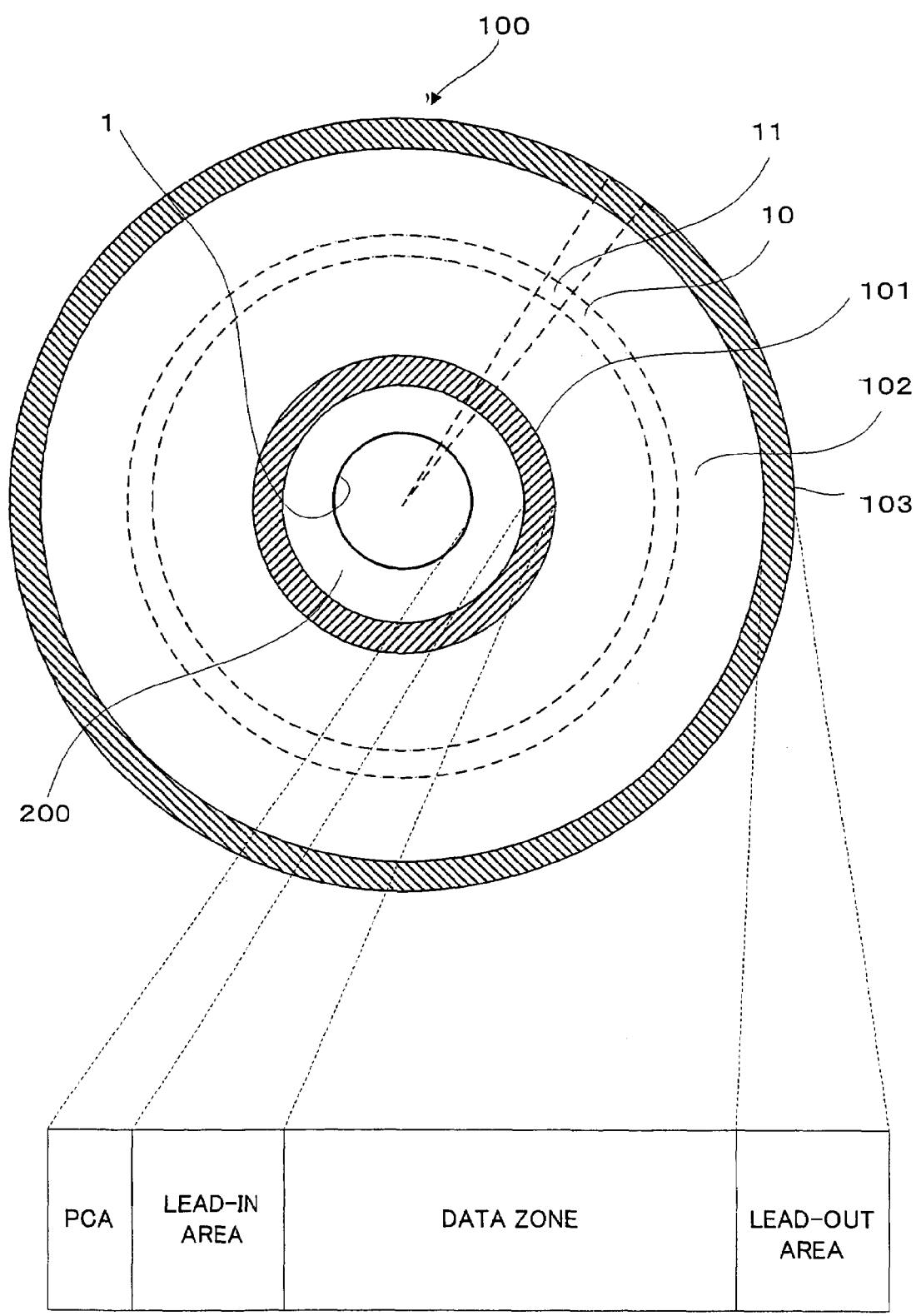
FIG. 1 shows the basic structure of an optical disc, which is one embodiment of an information recording medium used for the present invention, wherein the upper part is a substantial plan view of the optical disc having a plurality of recording areas, and the lower part, which corresponds to the upper part, is a schematic diagram of a recording area structure in the radial direction.

As shown in FIG. 1, an optical disc 100 is provided with: an PCA (i.e., an OPC area or a recording area for OPC) 200; a lead-in area 101; a data zone 102; and a lead-out area 103, which are associated with the embodiment, from the inner to the outer circumferential side, with a center hole 1 as the center, on a recording surface on the disc main body with a diameter of about 12 cm, as is a DVD. Specially, the PCA 200 is provided for the detection of the optimum recording laser power, i.e. the calibration of the recording laser power. Tracks 10, such as groove tracks and land tracks, are alternately placed in each recording area, spirally or concentrically, with the center hole 1 as the center, for example.

Figure 2:
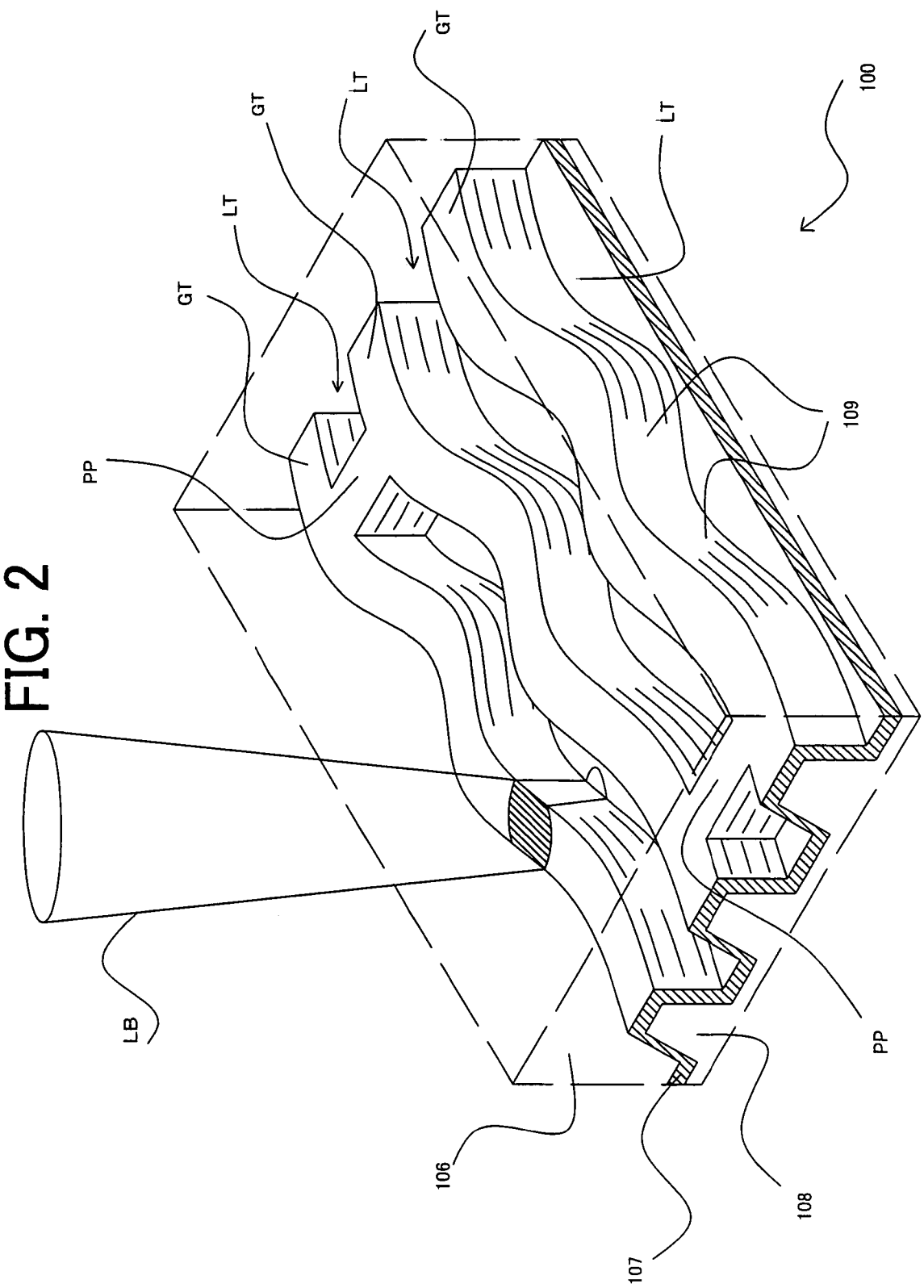
FIG. 2 is a partially enlarged perspective view of a recording surface of the optical disc in the embodiment.

In the embodiment, as shown in FIG. 2, in the optical disc 100, a recording layer 107 of a destructive writing type constituting the information recording surface is laminated under (as shown in FIG. 2) a disc-shaped transparent substrate 106, and a reflection layer 108 is laminated under (as shown in FIG. 2) the recording layer 107. On the information recording surface constructed from the surface of the recording layer 107, groove tracks GT and land tracks LT are alternately formed. Incidentally, upon the recording and the reproducing of the optical disc 100, a laser beam LB is irradiated onto the groove tracks GT through the transparent substrate 106, as shown in FIG. 2, for example. For example, upon recording, the destructive writing is performed onto the recording layer 107 according to the record data by irradiating the laser beam LB with the recording laser power. On the other hand, upon reproducing, the record data destructively written onto the recording layer 107 is read by irradiating the laser beam LB with a reproduction laser power which is weaker than the recording laser power.

Particularly in the embodiment, the groove tracks GT are wobbled with a certain amplitude and at a certain spatial frequency. Namely, the groove tracks GT are wobbled, and the cycle of wobbles 109 thereof is set to a predetermined value. On the land tracks LT, there are formed address pits referred to as land pre-pits PP for indicating the pre-format address information. By the two addressing (i.e. the wobble 109 and the pre-pit PP), it is possible to obtain necessary information for controlling the disc rotation during recording, for generating a recording clock, or for recording the data, such as a record address. Incidentally, it is also possible to record the pre-format address information in advance by modulating the wobbles 109 of the groove tracks GT in a predetermined modulation method, such as frequency modulation and phase modulation.

Again in FIG. 1, the data is recorded onto the track 10 by a cluster unit, which is a data management unit obtained by combining 32 units of sectors 11, for example. On the other hand, with respect to a data management unit of the pre-format address information which is error-correctable, one cluster is equivalent to three ADIP (Address In Pre-groove) words.

Incidentally, the present invention is not particularly limited to the optical disc 100 having the four recording areas as shown in FIG. 1. For example, the PCA 200 is not necessarily placed in the most inner circumference. For example, in FIG. 1, it may be placed inside the lead-in area 101, inside the data zone 102, inside the lead-area 103, or the like. Alternatively, it may be placed between the lead-in area 101 and the data zone 102, between the data zone 102 and the lead-out area 103, or on the outer side of the lead-out area 103. The presence of the lead-in area 101 or the lead-out area 103 is also arbitrary. At least the two recording areas, which are the PCA 200 in which the OPC pits or the OPC pattern are recorded and the data zone 102 in which the record data is recorded, may be provided. In addition, such an PCA may be placed as a unified area or placed with it divided into a plurality of areas.

Next, with reference to FIG. 3, the structure of the recording area of the optical disc in the embodiment of the present invention and the information and data recorded on the optical disc will be explained. FIG. 3 shows the recording area of the optical disc, which is one embodiment of the information recording medium of the present invention. Incidentally, the left side in FIG. 3 corresponds to the inner circumferential side of the optical disc 100, and the right side in FIG. 3 corresponds to the outer circumferential side of the optical disc 100.

Figure 3:
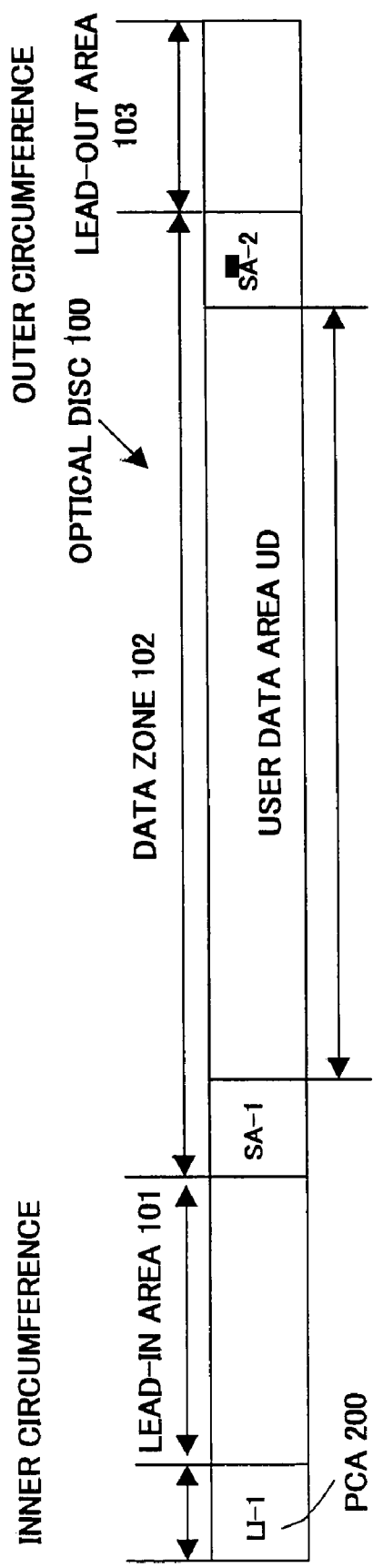
FIG. 3 is a structural diagram of the recording area of the optical disc in the embodiment of the information recording medium.

As shown in FIG. 3, in the recording area of the optical disc 100, there are the PCA 200 and the lead-in area 101 on the inner circumferential side thereof, the data zone 102 on the outer circumferential side of the lead-in area 101, and the lead-out area 103 on the outer circumferential side of the data zone 102.

Various information for controlling or managing the recording and reproducing of the data is recorded into the lead-in area 101 and the lead-out area 103. The control information is information for controlling the recording into and reading from the data zone 102, and it is, for example, information for indicating the attribute and the type of the information recording medium, information for management the address of the data, information for controlling a recording operation and a reading operation of an information recording/reproducing apparatus, such as a disc drive, or the like.

The PCA is a recording area used in the OPC processing described later, i.e. the detection of the optimum recording laser power, i.e. the calibration of the recording laser power.

The above-described data or user data is recorded into the data zone 102. The data zone 102 is provided therein with a user data area UD, and provided with spare areas SA-1 and SA-2 on the inner and outer circumferential sides of the user data area UD. The user data area UD is a main area for recording the data. The spare areas SA-1 and SA-2 are alternative recording areas for evacuating the data from a defect in the user data area UD.

The control information and the management information, and the data, which are recorded onto the information recording medium as explained above, cannot be always distinguished clearly according to their contents. However, there is the following difference. The control information and the management information are mainly used directly for the operation control of the information recording/reproducing apparatus, such as the disc drive. On the other hand, the data mainly becomes only the object of recording or reading on the information recording/reproducing apparatus and is mainly used for the data reproducing or the program executing performed by a backend or a host computer, for example. According to such a difference in their characteristics or the like, the data is recorded into the data zone 102, while the control information and the management information are recorded into the PCA 200, the lead-in area 101, and the lead-out area 103.

Next, with reference to FIGS. 4 to FIG. 6, the OPC processing of detecting the optimum recording laser power associated with the embodiment of the present invention, i.e. the calibration of the recording laser power, will be explained. Here, the "optimum recording laser power" is a recording laser power for minimizing the influence of asymmetry as well as for recording the data so as to obtain the most excellent reproduction quality of the data. The "asymmetry" is such a phenomenon that both a short pit and a long pit become longer (or shorter) gradually, by the same amount in the direction of the pit length thereof, upon mass-producing the optical disc. In the embodiment, the extent of the influence of the asymmetry is quantitatively indicated by an "asymmetry value" described later.

Figure 4:
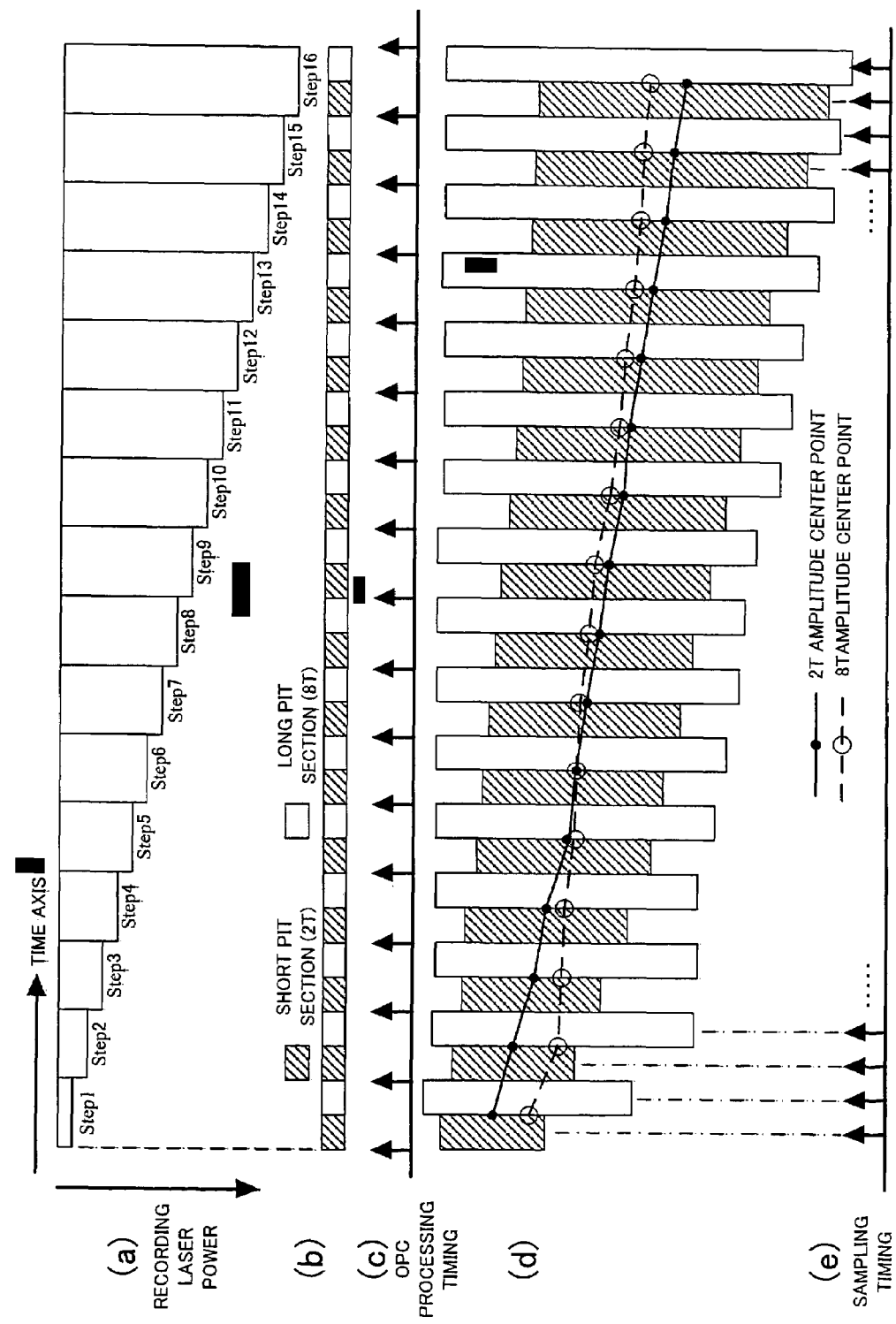
FIG. 4 is a group of schematic timing charts showing one OPC processing in the case of 16 power-steps associated with the embodiment.

FIG. 4 schematically shows one OPC processing in the case of 16 power-steps. FIG. 5 schematically shows the detail of 1 power-step out of the one OPC processing. FIG. 6 is a graph wherein asymmetry values are plotted for each power-step in the one OPC processing. Here, the "power-step" is a step or stage for changing the light intensity (power) of the recording laser in order to detect the optimum recording laser power in the OPC processing.

In part (a) of FIG. 4, the vertical axis of the graph indicates the value of the recording laser power, and the horizontal axis indicates a time axis time-divided for each power-step. Part (b) of FIG. 4 shows time sections in which the generated recording laser is changed alternately for a short pit pulse of 2T pulse and for a long pit pulse of 8T pulse and irradiated, for example. Part (c) of FIG. 4 shows a timing at which the recording laser is irradiated for the purpose of the calibration of the several (e.g. 16) different laser powers, with arrows pointed upward. The vertical axis in part (d) of FIG. 4 indicates an amplitude voltage of a reproduction Radio Frequency (RF) signal. Part (e) of FIG. 4 shows a sampling timing for calculating the voltage of the amplitude center of the reproduction RF signal with arrows pointed upward.

In the embodiment, as shown in part (a) of FIG. 4, the recording laser for the calibration is time-divided for each of the 16 power-steps and irradiated with the 16 different laser powers onto the PCA of the optical disc, for example. At this time, in each power-step, the recording laser generated by alternately changing the short pit pulse of 2T pulse and the long pit pulse of 8T pulse, for example, which are a test signal with the shortest pit length and the longest pit length of a 2-3 modulated signal, is irradiated to perform the recording. Here, as shown in FIG. 4, a time length for recording the short pit pulse is assigned to the former half of one power-step and regarded as a "short pit section". On the other hand, a time length for recording the long pit pulse is assigned to the latter half of the one power-step and regarded as a "long pit section".

Figure 5:
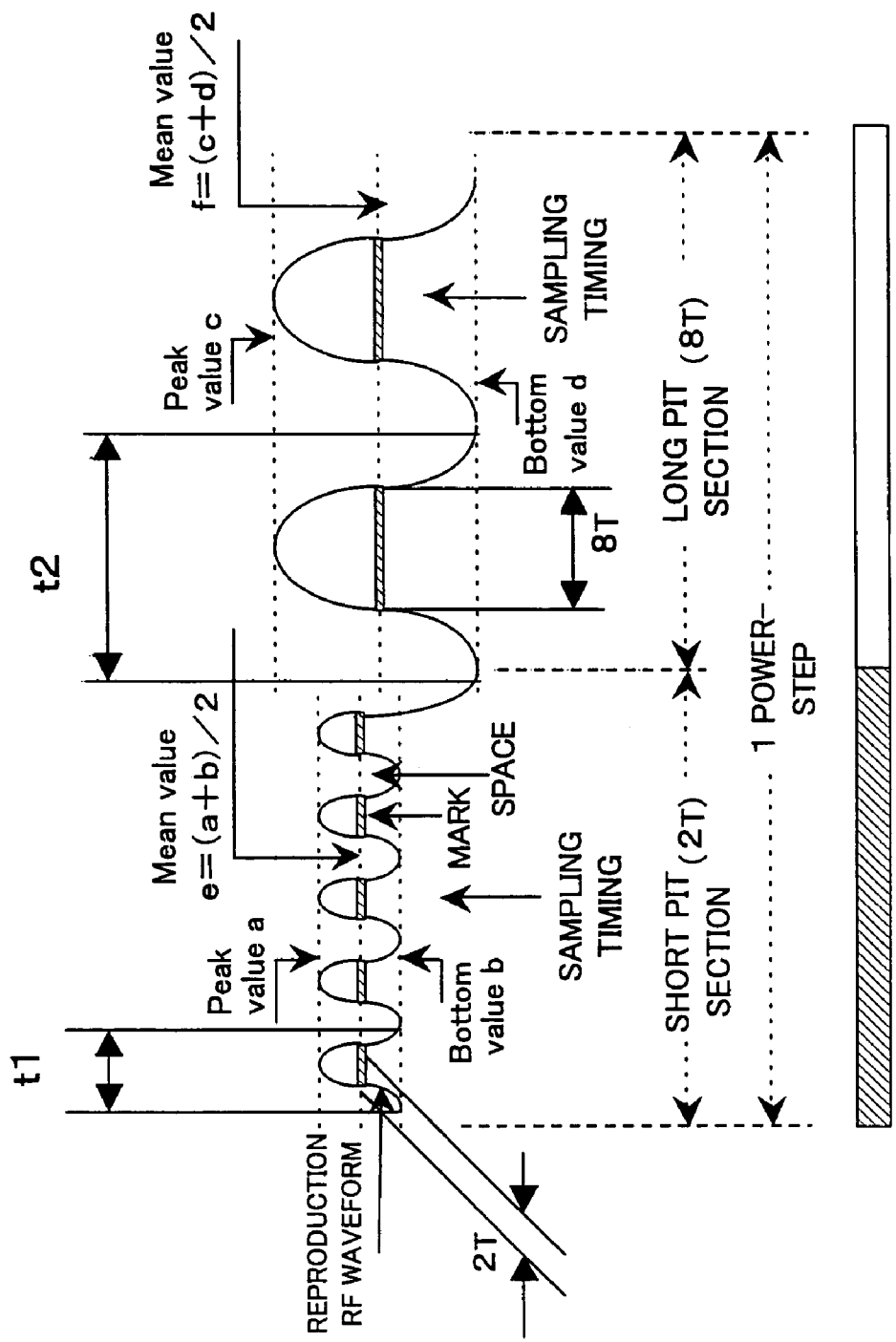
FIG. 5 is a waveform chart showing the detail of 1 power-step in the one OPC processing associated with the embodiment.

As shown in FIG. 5, in the embodiment, with respect to each power-step, a plurality of 2T marks (five 2T marks in FIG. 5) are recorded with the 2T pulses into one short pit section, and a plurality of 8T marks (two 8T marks in FIG. 5) are recorded with the 8T pulses into one long pit section. One pair of the short pit section and the long pit section as described above, i.e. a plurality of OPC pits having a predetermined pattern, is regarded as the "OPC pattern". The one OPC processing is completed by repeatedly recording the OPC pattern as shown in FIG. 5 only by the number of the power-steps (i.e. 16 times) while the laser power is sequentially changed.

After the recording of the OPC pattern for each power-step as shown in FIG. 5 is completed with respect to 16 power-steps in the one OPC processing as described above, reproduction processing of reproducing this OPC pattern is performed. Specifically, after the recording of the OPC pattern with respect to 16 power-steps are completed, the laser which is irradiated onto the PCA is changed from the recording laser to the reproduction laser (e.g. the laser power is changed to the reproduction laser power which is much weaker than the recording laser power). By the irradiation of the reproduction laser, the reproduction processing including envelope detection or the like is performed as follows.

Upon reproducing in the OPC processing, a peak value and a bottom value of the envelope of the reproduction RF signal corresponding to the OPC pits formed in the short pit section (i.e. the 2T marks), for example, are sampled at the sampling timing shown in part (e) of FIG. 4, by which the voltage of the amplitude center is calculated. In Part (e) of FIG. 4, the value in each power-step of the calculated voltage of the amplitude center is plotted with a black circle which is relatively small, and an interpolation line connecting the values is shown with a solid line. In the same manner, the value in each power-step of the calculated voltage of the amplitude center of the reproduction RF signal corresponding to the OPC pits formed in the long pit section (i.e. the 8T marks) is plotted with a white circle which is relatively big, and an interpolation line connecting the values is shown with a broken line. The intersection of the two interpolation lines is shown with a double circle, and a laser power in the power-step corresponding to the intersection is determined to be the optimum recording laser power. Namely, the optimum recording laser power is the recording power at the 6th step of power-steps in the embodiment.

More specifically, as shown in FIG. 5, it is assumed that the peak value of the envelope of the reproduction RF signal which is reproduced in the short pit section is "a" and that the bottom value thereof is "b". Incidentally, the "a" and "b" are collected at the sampling timing, as described above. It is assumed that the mean value of the both values, i.e. the calculated voltage of the amplitude center, is "e". Namely, "e=(a+b)/2". In the same manner, it is assumed that the peak value of the envelope of the reproduction RF signal which is reproduced in the long pit section is "c" and that the bottom value thereof is "d". It is assumed that the calculated voltage of the amplitude center is "f=(c+d)/2".

In the embodiment, the extent of the influence of the asymmetry is judged by comparing "e" with "f". In FIG. 5, the voltage of the amplitude center "e" is larger than "f", and the both values disagree. The above-described "asymmetry value" is defined as "e−f". A laser power, corresponding to the power-step in which "e=f" and the "asymmetry value=0", is determined to be the optimum recording laser power.

Figure 6:
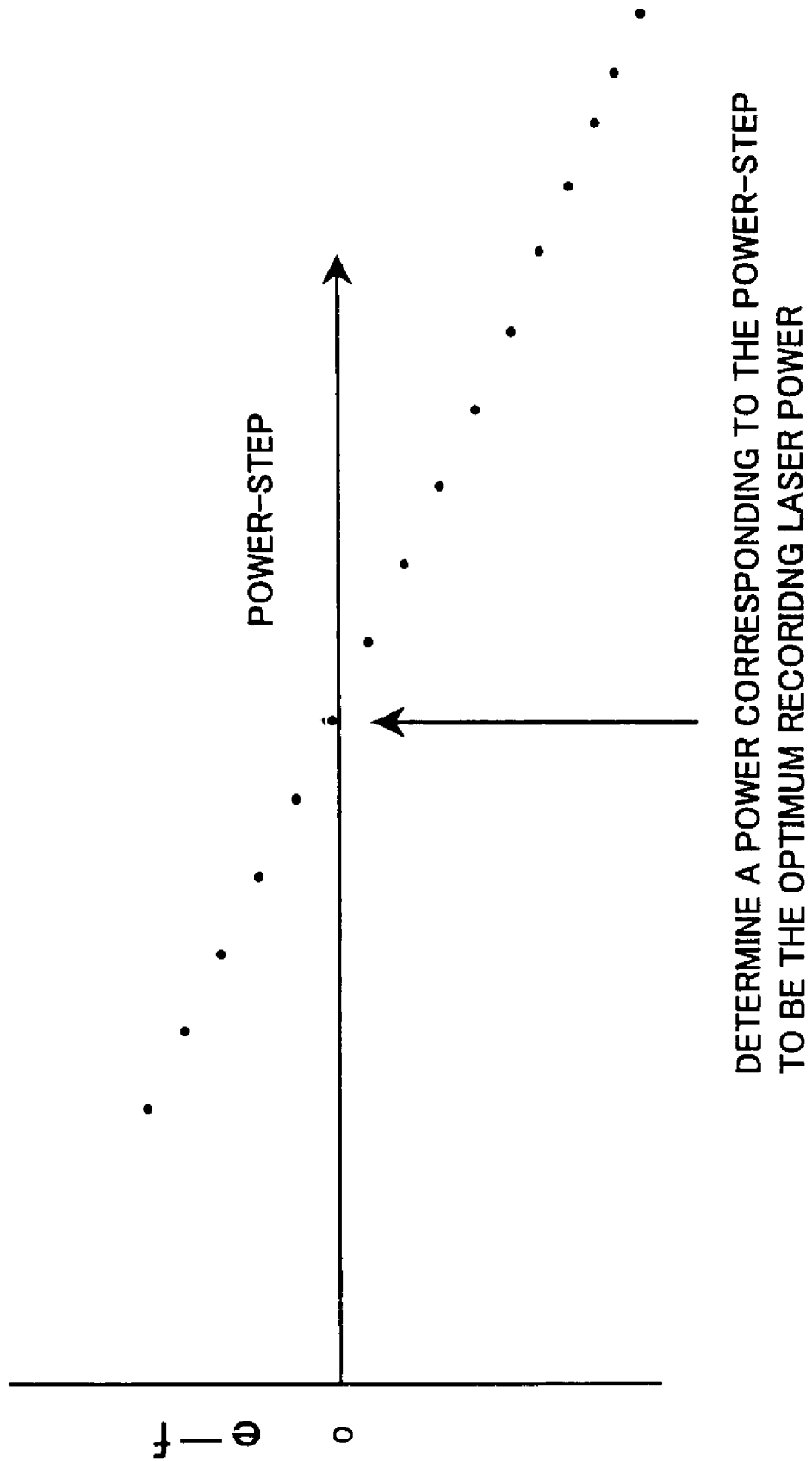
FIG. 6 is a graph wherein asymmetry values are plotted for each power-step in the one OPC processing associated with the embodiment.

The vertical axis of FIG. 6 shows such an asymmetry value "e−f", and the horizontal axis shows the power-step. The vertical arrow shows the power-step in which "e=f" and the "asymmetry value=0".

As shown in FIG. 6, in the embodiment, the laser power corresponding to the power-step in which the "asymmetry value=0" is determined to be the optimum recording laser power.

Figure 7:
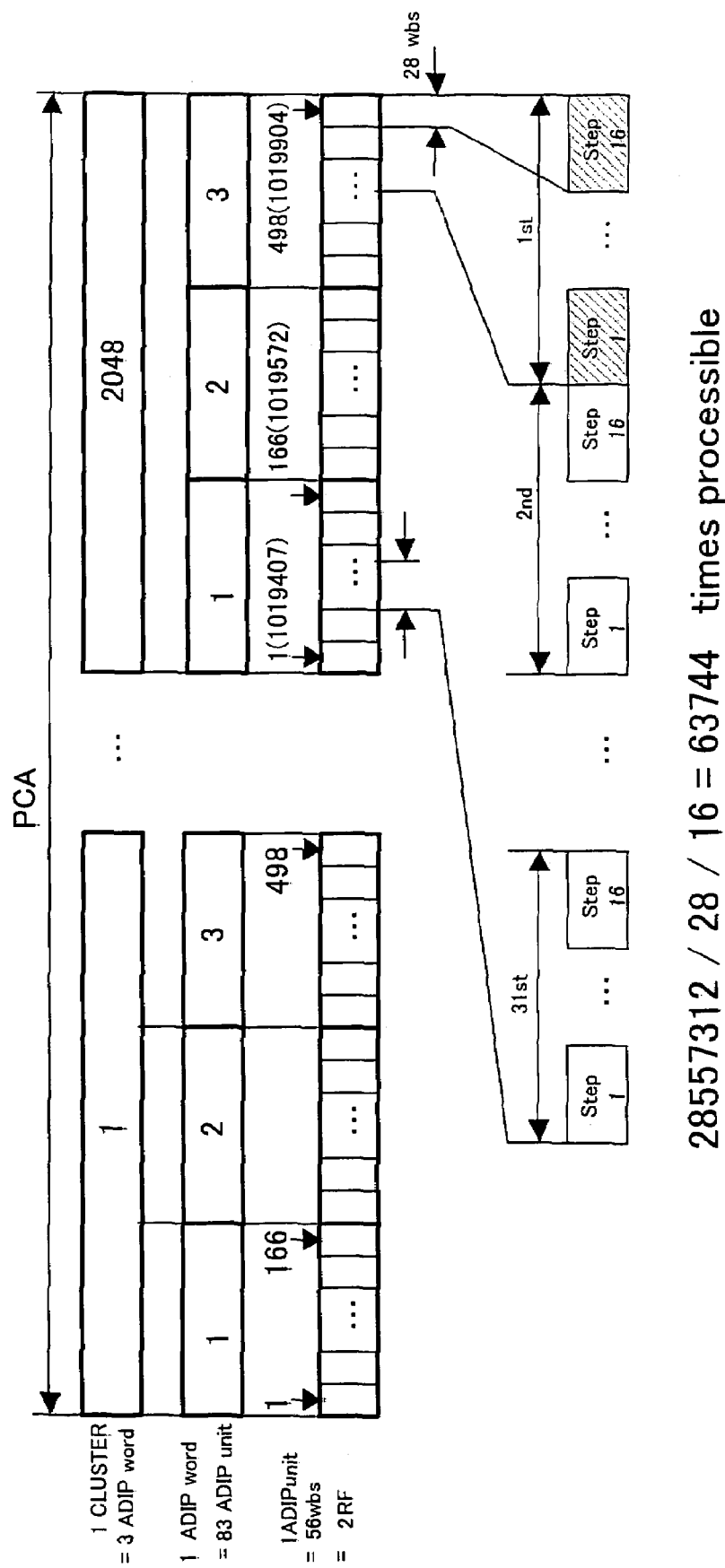
FIG. 7 is a schematic structural diagram if 1 RF on an PCA having 2048 clusters, which is used for the 1 power-step in the 16-power-step OPC processing, is set to be a management unit of 28 wbs.

As described above, the detection of the optimum recording laser power in the embodiment, i.e. the calibration of the recording laser power, is executed as obtaining the optimum recording laser power corresponding to the power-step in which the "asymmetry value=0". Particularly, as apparently shown in part (c) and part (e) of FIG. 4, it is possible to adjust and match the timing between the recording and the reproducing of the OPC pattern, with one cycle of the wobble signal of the groove tracks as a reference. Namely, as shown in FIG. 7 described later, the OPC processing which uses (i) the management unit smaller than the conventional one (i.e. the data management unit) can be performed by using the ADIP word, which is the data management unit of the pre-format address information, in combination with (ii) the slot unit by which a finer or detailed position can be specified. In the embodiment, as explained later with reference to FIG. 7 to FIG. 10, the OPC pattern is recorded by using the management unit which is N times as long as one cycle of the wobble signal (N: natural number), as the management unit smaller than the cluster unit or the sector unit, which is the conventional data management unit by an address.

Incidentally, the number of the power-steps in the one OPC processing is not limited to 16. For example, it may be about 10 to 20. Alternatively, it may be less or more than about 10 to 20. In the embodiment, the OPC pattern is constructed by using the 2T mark and the 8T mark, but other marks, such as a 3T mark and a 7T mark, can be also used.

Next, with reference to FIG. 7 to FIG. 9, the way to use the PCA associated with the embodiment of the present invention will be explained more specifically.

FIG. 7 is a schematic structural diagram if 1 Recording Frame (hereinafter referred to as RF, as occasion demands) on the PCA 200 having 2048 clusters, which is used for the 1 power-step in the 16-power-step OPC processing, is set to be a management unit of 28 wobbles (hereinafter referred to as wbs, as occasion demands). FIG. 8 is a schematic structural diagram if 1 RF, which is used for the 1 power-step in the 32-power-step OPC processing, is set to be a management unit of 28 wbs. FIG. 9 is a schematic structural diagram if 1RF, which is used for the 1 power-step in the 16-power-step OPC processing, is set to be a management unit of 1 wbs.

Firstly, with reference to FIG. 7, how many times the 16-power-step OPC processing can be performed if 1 RF, which is used for the 1 power-step, is set to be a management unit of 28 wbs will be explained.

In the embodiment, in place of the conventional data management unit based on the sector, 28 wbs, which is N times as long as one cycle of the wobble (N: natural number, N=28 on this occasion), is regarded as the management unit of the OPC pattern (i.e. the OPC pits of the 1 power-step) as shown in FIG. 5. This makes it possible to maintain accuracy by the management unit smaller than the conventional data management unit, such as the sector, in accordance with the extent of the fragmentation or division by the management unit. The management unit of the OPC pattern is managed by a table or the like recorded in the lead-in area, the data area, or the like, aside from the data management unit.

Specifically, if the PCA defined in the Blu-ray Disc REwritable (BD-RE) standard is applied to a Blu-ray Disc Write Once (BD-WO), the size thereof is 2048 clusters. 1 cluster is equivalent to 3 ADIP words. 1 ADIP word is equivalent to 83 ADIP units. 1 ADIP unit is equivalent to 56 wobbles (wbs). Consequently, the size of the PCA is calculated to be 2048×3×83×56=28557312 wbs.

Here, it is defined that 1 RF is 28 wbs, as the management unit of the OPC pattern (refer to FIG. 5). Incidentally, 1 ADIP unit is 2 RF. Therefore, the recording frame number of the PCA is 28557312/28=1019904 RF.

Consequently, in the PCA defined with 2048 clusters, if 1 RF used for the 1 power-step (i.e. the length of the OPC pattern as shown in FIG. 5) is set to be 28 wbs, the 16-power-step OPC processing, i.e. the OPC processing with 16 RF, can be performed 1019904/16=63744 times.

Next, with reference to FIG. 8, how many times the 32-power-step OPC processing can be performed if 1 RF, which is the same management unit as in FIG. 7, is set to be a management unit of 28 wbs will be explained.

In the same manner as explained in FIG. 7, the recording frame number of the PCA is 28557312/28=1019904 RF.

Consequently, in the PCA defined with 2048 clusters, if 1 RF used for the 1 power-step (i.e. the length of the OPC pattern as shown in FIG. 5) is set to be a management unit of 28 wbs, the 32-power-step OPC processing, i.e. the OPC processing with 32 RF, can be performed 1019904/32=31872 times.

Next, with reference to FIG. 5 and FIG. 6 described above, as occasion demands, in addition to FIG. 9, the shortest management unit which can be used for recording the OPC pattern will be explained.

As shown in FIG. 5, if the peak value "a" and the bottom value "b" of the short pit section, and the peak value "c" and the bottom value "d" of the long pit section, which are described above, are collected at the sampling timing, theoretically, it is possible to specify the optimum recording laser power (refer to FIG. 6). Thus, the management unit which is N times as long as one cycle of the wobble signal (N: natural number) for recording the OPC pattern may have at least a time width of "t1+t2", which is the sum of "t1" of the short pit section and "t2" of the long pit section in FIG. 5. Specifically, "t1" is a combination of the mark and a space, "t1=2T×2", and in the same manner, "t2" is a combination of the mark and a space, "t2=8T×2". Thus, the shortest management unit is "t1+t2=4T+16T=20T". Here, "T" is a standard clock cycle. For example, in the case of the DVD-R, 0.133 (μm)/3.49 (m/s)=about 38.2 (ns), which are described above.

Therefore, for example, in the case of the BD-RE, the length of 1 wobble (wbs) is 69 (Channel bit)×2=138T which is larger than 20T, so that theoretically, 1 wobble can be 1 power-step. However, practically, an Analog to Digital Conversion (A/D conversion) is performed to the sampled peak value and the sampled bottom value of the reproduction RF signal, so that it is also possible to increase the above-described time width according to the resolution in the practical band of the A/D conversion.

How many times the 16-power-step OPC processing can be performed if the theoretical shortest management unit described above is adopted, namely, if 1RF is set to be 1 wbs, will be explained.

Figure 8:
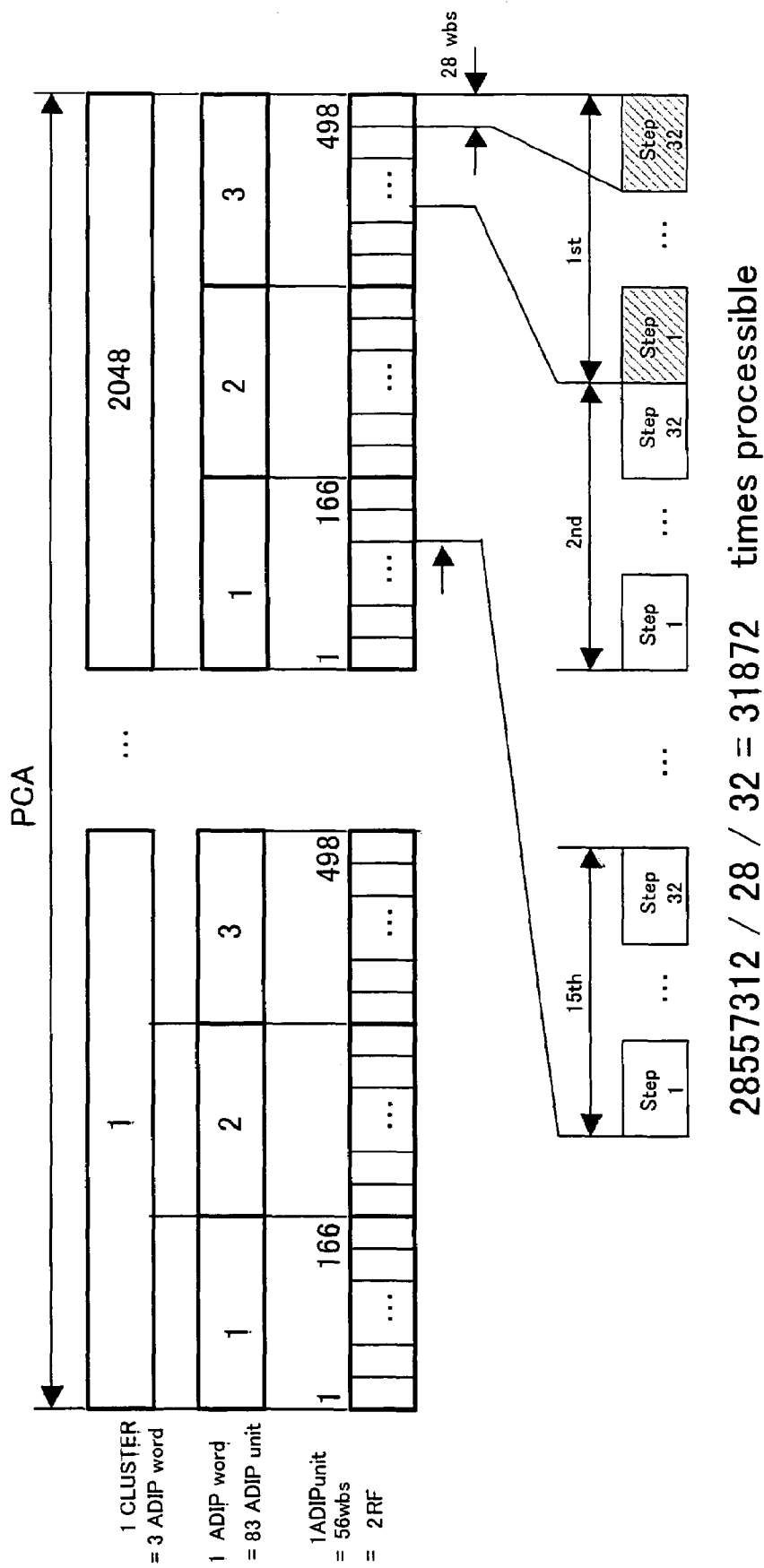
FIG. 8 is a schematic structural diagram if 1 RF, which is used for the 1 power-step in the 32-power-step OPC processing, is set to be a management unit of 28 wbs.
Figure 9:
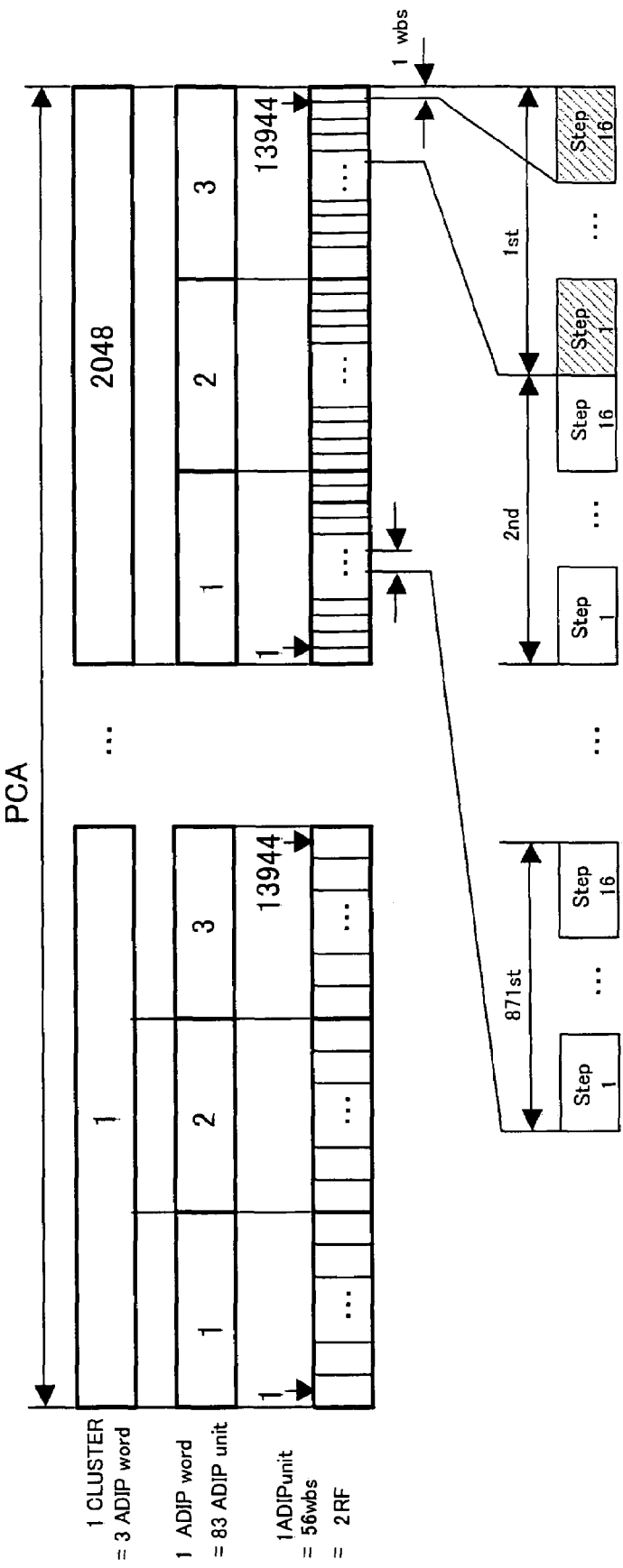
FIG. 9 is a schematic structural diagram if 1 RF, which is used for the 1 power-step in the 16-power-step OPC processing, is set to be a management unit of 1 wbs.

As opposed to the explanation for FIG. 7 and FIG. 8, the recording frame number of the PCA is 28557312/1=28557312 RF. Therefore, in this case, the 16-power-step OPC processing, i.e. the OPC processing with 16 RF, can be performed 28557312/16=1784832 times.

As explained with reference to FIG. 7 to FIG. 9, in the embodiment, it is possible to shorten the management unit of the OPC pattern (refer to FIG. 5) by each light intensity corresponding to the power-step and perform the OPC processing more times, as compared with the conventional manner. Particularly, in this case, as shown in part (c) and part (e) of FIG. 4, it is possible to adjust and match the time axis highly accurately by the management unit which is set by one cycle of the wobble as the standard, between the recording and the reproducing of the OPC pattern (refer to FIG. 5). Thus, it is possible to perform the OPC processing highly accurately although it is executed by the management unit of a shorter time as compared with the conventional manner.

(Information Recording/Reproducing Apparatus)

Next, with reference to FIG. 10 and FIG. 11, the structure and the operation of an embodiment of the information recording/reproducing apparatus associated with the present invention will be explained. Incidentally, the "information recording apparatus" associated with the present invention is constructed from a part related to the recording of the information recording/reproducing apparatus associated with the embodiment.

Figure 10:
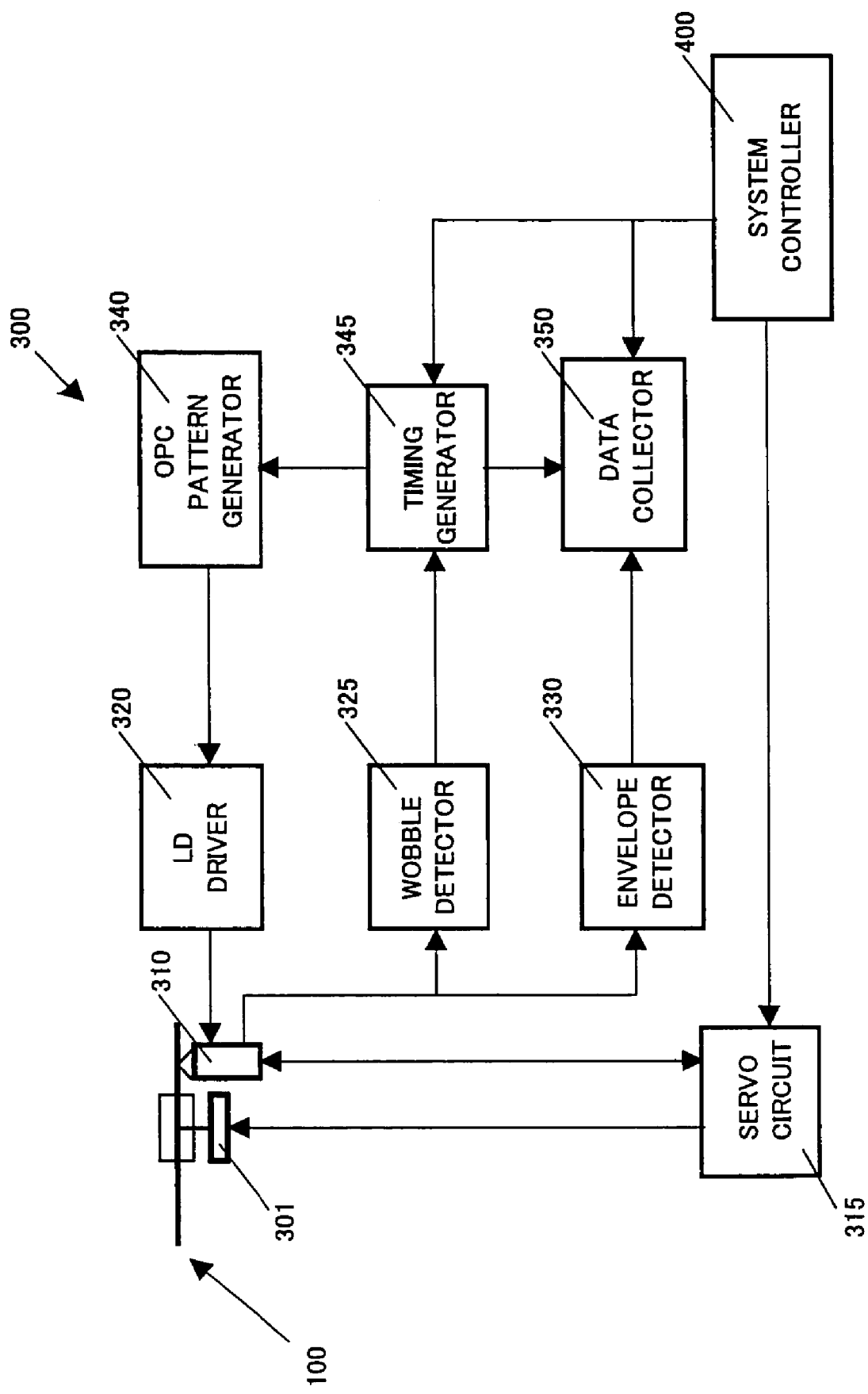
FIG. 10 is an entire schematic block diagram of an embodiment of an information recording/reproducing apparatus associated with the present invention.

FIG. 10 shows the outline structure of the information recording/reproducing apparatus associated with the embodiment. FIG. 11 shows the detailed structure associated with the recording and the reproducing of the OPC processing on the information recording/reproducing apparatus associated with the embodiment.

Firstly, with reference to FIG. 10, the outline structure of the information recording/reproducing apparatus in the embodiment will be explained.

In FIG. 10, an information recording/reproducing apparatus 300 in the embodiment is provided with: a function of recording the record data onto the optical disc 100; and a function of reproducing the record data recorded on the optical disc 100. Namely, the information recording/reproducing apparatus 300 is an apparatus for recording information onto the optical disc 100 and reading the information recorded on the optical disc 100, under the control of a system controller 400.

The information recording/reproducing apparatus 300 is provided with: a spindle motor 301; an optical pickup 310 which is one example of the "optical pickup device" associated with the present invention; a servo circuit 315; a Laser Diode (LD) driver 320; a wobble detector 325 which is one example of the "detecting device" associated with the present invention; an envelope detector 330; an OPC pattern generator 340; a timing generator 345 which is one example of the "timing generating device" associated with the present invention; a data collector 350; and the system controller 400 which is one example of the "optimum-laser-power-detecting device" associated with the present invention.

The spindle motor 301 is constructed to rotate the optical disc 100 at a predetermined speed while receiving spindle servo from the servo circuit 315 or the like.

The optical pickup 310 performs the recording or reproducing with respect to the optical disc 100, and is provided with a semiconductor laser apparatus, various lenses, actuators, or the like. More specifically, upon reproducing, the optical pickup 310 irradiates a laser beam, such as the laser light, onto the optical disc 100 as reading laser beam with first power. Upon recording, the optical pickup 310 irradiates a light beam, with it modulated, onto the optical disc 100 as writing laser beam with second power. The optical pickup 310 is constructed to move in the radial direction or the like of the optical disc 100 by a not-illustrated actuator, slider, or the like driven by the servo circuit 315.

The servo circuit 315 makes an objective lens of the optical pickup 310 move on the basis of a tracking error signal and a focus error signal or the like, which are obtained by processing the result of received laser light of the optical pickup 310, and by this operation, the servo circuit 315 performs various servo processing, such as tracking control and focus control. The servo circuit 315 is also constructed to servo-control the spindle motor 301 by using as a reference the wobble signal obtained from the wobbles 109 of the groove tracks GT (refer to FIG. 2) which are wobbled on the optical disc 100.

The LD driver 320 drives a semiconductor laser disposed in the optical pickup 310 so as to determine the optimum recording laser power by the above-described recording and reproducing of the OPC pattern. The LD driver 320 is constructed to drive the semiconductor laser of the optical pickup 310 with the optimum recording laser power determined from the above-described OPC processing upon recording the data. Upon recording the data, the optimum recording laser power is modulated according to the record data. On the other hand, upon reproducing the data, the laser power is fixed to a constant value for reading which is lower than a value for recording.

The wobble detector 325 is constructed to detect a push-pull signal for indicating the wobble signal and output it to the timing generator 345, on the basis of an output signal corresponding to the amount of received laser light from a detector, which is disposed in the optical pickup 310, for receiving a reflected laser light.

The envelope detector 330 is constructed to detect the peak value and the bottom value of the envelope detection of the reproduction RF signal in order to determine the optimum recording laser power, under the control of the system controller 400 upon reproducing the OPC pattern in the OPC processing.

The OPC pattern generator 340 is constructed to output a signal for indicating the OPC pattern (refer to FIG. 5) to the LD driver 320 on the basis of a timing signal from timing generator 345 upon recording the OPC pattern in the OPC processing.

The timing generator 345 detects absolute position information which uses the pre-format address information indicated by the land pre-pit PP, i.e., the data management unit of the ADIP word as a reference, from the push-pull signal for indicating the wobble signal outputted to the timing generator 345 from the wobble detector 325, upon recording the OPC pattern in the OPC processing. At the same time, the timing generator 345 detects relative position information which uses the slot unit smaller than the data management unit of the ADIP word, e.g., a slot unit corresponding to a length which is N times as long as one cycle of the wobble signal of 28 wbs described above (N: natural number: N=28 on this occasion) as a reference, on the basis of the cycle of the push-pull signal for indicating the wobble signal. Thus, regardless of whether or not a recording start position in the OPC processing starts from the data management unit of the pre-format address information, i.e. from the boundary of each ADIP word, the timing generator 345 is capable of specifying the recording start position. Then, the timing generator 345 generates and outputs a timing signal for writing the OPC pattern, on the basis of the cycle of the push-pull signal for indicating the wobble signal outputted from the wobble detector 325. On the other hand, the timing generator 345 is capable of specifying a reproduction start position upon reproducing the OPC pattern in the OPC processing, in the same manner as upon recording. Then, the timing generator 345 generates and outputs a timing signal for sampling the reproduced OPC pattern, on the basis of the cycle of the push-pull signal for indicating the wobble signal outputted from the wobble detector 325.

In order to detect the optimum recording laser power, the system controller 400 controls all the information recording/reproducing apparatus 300 by giving an instruction, i.e., by outputting a system command to each device, such as the LD driver 320 and the servo circuit 315. Typically, software for operating the system controller 400 is stored in a memory disposed inside or outside.

The data collector 350 is mainly a general memory. Specifically, it is constructed from an external RAM described later. Particularly in the embodiment, the value of the envelope detected by the envelope detector 330 is stored into the data collector 350. On the basis of this, the detection of the optimum recording laser power of the system controller 400, i.e., the OPC processing is performed.

Next, with reference to FIG. 10, the outline operation of the information recording/reproducing apparatus in the embodiment will be explained.

In FIG. 10, at first, when the optical disc 100 is inserted or loaded, a seek operation is performed by the optical pickup 310 under the control of the system controller 400, and the data which is reproduced on a decoder is obtained. By this, various data for management, which is necessary for the processing of the optical disc 100, is obtained. On the basis of the data for management, the optical disc 100 is accessed according to an instruction from a host device or a backend or the like, under the control of the system controller 400.

Following this processing or if a command of writing is inputted from the host device or the like, the OPC processing is performed under the control of the system controller 400. Namely, the optical pickup 310 is moved to the PCA under the control of the system controller 400, and the recording laser power is changed sequentially step-by-step by the control of the OPC pattern generator 340 and the LD driver 320 or the like, which causes the OPC pattern to be recorded into the PCA (refer to FIG. 4 and FIG. 5). Particularly at this time, under the control of the system controller 400, the slot unit associated with the present invention corresponding to a length which is N times as long as one cycle of the wobble signal is detected on the timing generator 345, and the timing signal is generated. On the basis of the timing signal, the recording laser power is changed sequentially step-by-step, and the OPC pattern is recorded into the PCA.

Moreover, after such trial writing into the PCA is completed, the OPC pattern written on a trial basis in the PCA is reproduced under the control of the system controller 400. Particularly at this time, as upon recording the OPC pattern, under the control of the system controller 400, the slot unit associated with the present invention corresponding to a length which is N times as long as one cycle of the wobble signal is detected on the timing generator 345, and the timing signal is generated. On the basis of the timing signal, the reproduced OPC pattern is sampled sequentially, and the optimum recording laser power is detected (refer to FIG. 4 and FIG. 5).

After that, the optical pickup 310 is moved to the recording area (e.g. the data zone 102 shown in FIG. 1) under the control of the system controller 400, and the record data is recorded into the recording area by modulating the laser beam according to the record data, with the recording laser power calibrated in advance, i.e. the optimum recording laser power, by the control of the LD driver 320 or the like. Namely, the recording pits according to the record data are formed onto the track.

On the other hand, upon reproducing the record data recorded in this manner, the optical pickup 310 is moved to the recording area (e.g. the data zone 102 shown in FIG. 1) under the control of the system controller 400, the laser beam is irradiated onto the recording area with the reproduction laser power which is lower than the recording laser power by the control of the LD driver 320 or the like. Then, the reproduction RF signal corresponding to the recording pits is detected by the optical pickup 310, and the record data corresponding to the recording pits is reproduced.

As described above, in the embodiment, the OPC processing in the PCA and the recording and reproducing of the record data in the recording area in the normal case are performed.

Next, with reference to FIG. 11, the structure and the operation upon recording in the OPC processing of the information recording/reproducing apparatus 300 will be explained in detail. Incidentally, the same constituent elements as those in FIG. 10 described above carry the same reference numerals, and their explanations will be omitted as occasion demands.

Firstly, with reference to FIG. 11, the structure of the information recording/reproducing apparatus 300 will be explained in detail.

Figure 11:
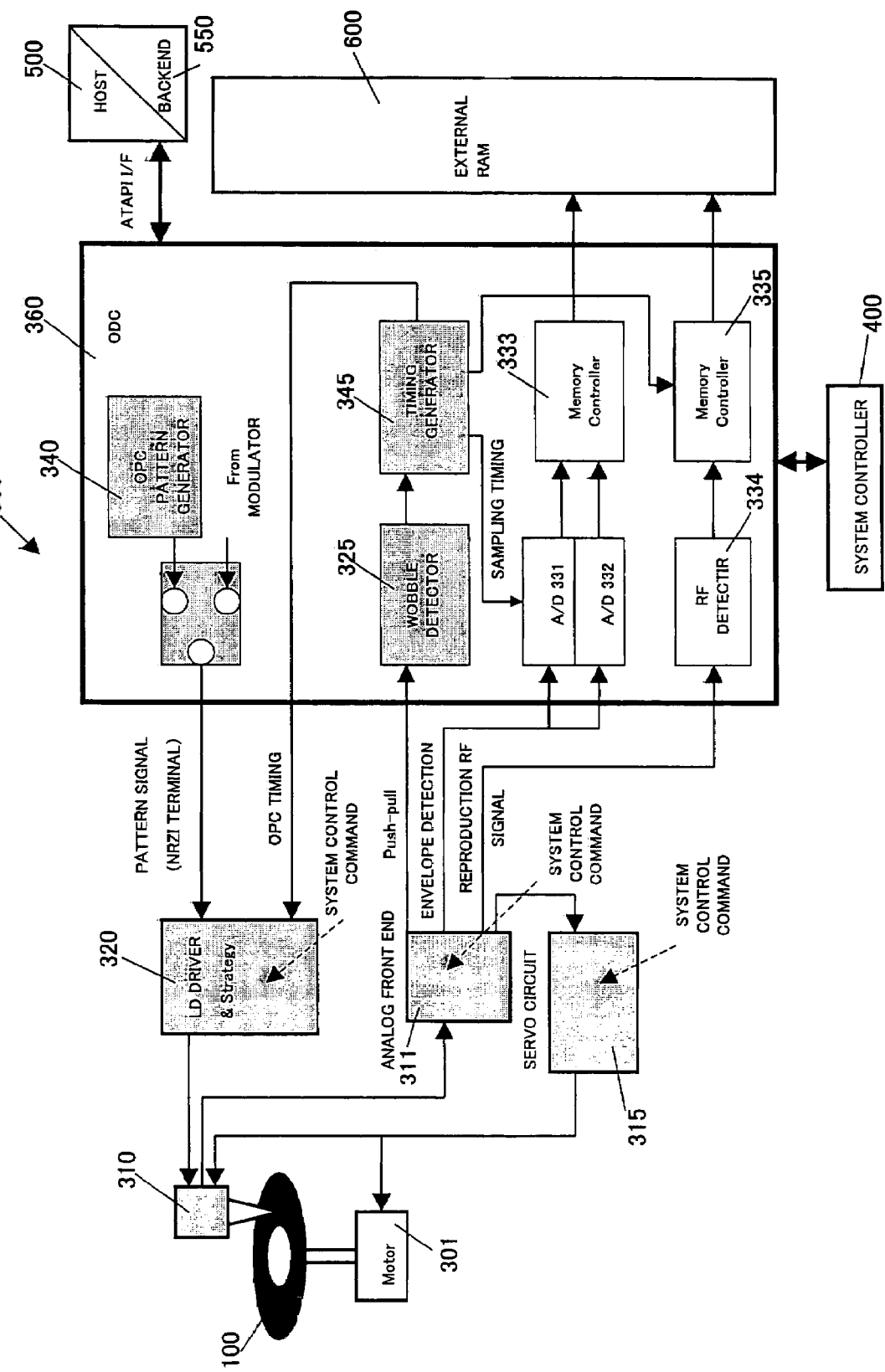
FIG. 11 is a block diagram showing the detailed structure of the embodiment of the information recording/reproducing apparatus.

In FIG. 11, the information recording/reproducing apparatus 300 is provided with: an analog front end 311; an Optical Disk Controller (ODC) 360; a host device 500 or a backend 550; and an external RAM 600, as new constituent elements, in addition to the spindle motor 301, the optical pickup 310, the servo circuit 315, the LD driver 320, and the system controller 400, which are explained above in FIG. 10. Incidentally, the host device 500 or the backend 550 are connected with the ODC 360 in the ATAPI (AT Attachment Packet Interface) standard.

More specifically, the ODC 360 is provided with: Analog/Digital (A/D) converters 331 and 332; memory controllers 333 and 335; and a RF detector 334, as new constituent elements, in addition to the wobble detector 325, the OPC pattern generator 340, and the timing generator 345, which are explained above in FIG. 10.

In FIG. 11, one example of the "detecting device" associated with the present invention is constructed from the wobble detector 325 and the analog front end 311.

In FIG. 11, one example of the envelope detector 330 in FIG. 10 is constructed from the A/D converters 331 and 332 and the analog front end 311.

In FIG. 11, one example of the data collector 350 in FIG. 10 is constructed from the memory controllers 333 and 335 and the external RAM 600.

Next, with reference to FIG. 11, the operation upon recording in the OPC processing of the information recording/reproducing apparatus 300 in the embodiment will be explained in detail.

Upon recording in the OPC processing, what operate are the spindle motor 301; the optical pickup 310; the servo circuit 315; the LD driver 320; the analog front end 311; the system controller 400; and the wobble detector 325, the OPC pattern generator 340, and the timing generator 345, which are disposed in the ODC 360. Incidentally, the constituent elements are highlighted in gray in FIG. 11.

Upon recording in the OPC processing, the OPC pattern generator 340 in the ODC 360 generates a NRZI (Non Return to Aero Inverted) modulation signal, as an OPC pattern signal for changing the recording laser power sequentially step-by-step. The NRZI modulation signal is outputted to the LD driver 320 from the ODC 360 via a shift switch. Incidentally, the shift switch is changed to the OPC pattern generator 340 side upon the OPC processing, and changed to the side of a modulator upon recording the data.

The LD driver 320 drives a semiconductor laser disposed in the optical pickup 310 so as to change the recording laser power sequentially step-by-step (refer to FIG. 4 and FIG. 5) with the NRZI modulation signal (i.e. the OPC pattern signal) from the OPC pattern generator 340.

Then, the analog front end 311 processes the result of received laser light outputted from the optical pickup 310, and generates a tracking error signal in a push-pull method. Incidentally, the tracking error signal is generated by calculating a difference between the results of received laser light in received laser light areas, which are divided in the inner and outer circumference directions of the optical disc 100, from the output signal of light-receiving elements which receive a main beam, for example. The signal level thereof changes according to a tracking error amount. The analog front end 311 outputs the tracking error signal to the servo circuit 315 and outputs it to the ODC 360.

The tracking error signal is inputted into the wobble detector 325 in the ODC 360. The wobble detector 325 outputs the wobble signal whose signal level changes according to the wobbling (the meandering) of the groove tracks GT by extracting a signal component of a predetermined frequency band from the tracking error signal.

The timing generator 345 binalizes the wobble signal and outputs a binary signal. A not-illustrated Phase-Locked Loop (PLL) circuit (i) processes the output binary signal, (ii) generates the timing signal which is used for a clock for writing, which is a generation standard of the OPC pits maintained in a constant relationship with the wobble signal synchronized with the wobbling (the meandering) of the groove tracks GT, i.e. the timing signal for writing the OPC pattern, and (iii) outputs it to the LD driver 320.

As a result, upon recording the OPC pattern in the OPC processing, it is possible to record the OPC pattern on the basis of the wobble signal of the groove tracks GT on the optical disc 100 under the control of the system controller 400.

Next, with reference to FIG. 11, the operation upon reproducing in the OPC processing of the information recording/reproducing apparatus 300 in the embodiment will be explained in detail.

Upon reproducing in the OPC processing, what operate are the spindle motor 301; the optical pickup 310; the servo circuit 315; the analog front end 311; the system controller 400; and the wobble detector 325, the timing generator 345, the A/D converters 331 and 332, and the memory controller 333, which are disposed in the ODC 360.

Even upon reproducing in the OPC processing, in the same manner as upon recording, the analog front end 311 outputs the tracking error signal to the servo circuit 315 and outputs it to the wobble detector 325. The analog front end 311 outputs the envelope detection of the reproduction RF signal to a peak hold circuit and a bottom hold circuit, which are not illustrated. Through the not-illustrated peak and bottom hold circuits, the peak value and the bottom value of the envelope detection of the reproduction RF signal are sampled on the A/D converters 331 and 332, and outputted to the memory controller 333. Particularly, the timing signal for sampling the OPC pattern is generated on the timing generator 345 on the basis of the cycle of the wobble signal from the wobble detector 325. The peak value and the bottom value are stored into the external RAM under the control of the system controller 400.

After such reproduction of the OPC pattern is performed in the one OPC processing, e.g. with respect to the 16-power-step OPC pattern, the optimum recording laser power is determined (refer to FIG. 6).

Incidentally, except for the temporal recording of the OPC pattern in the OPC processing described above, the external RAM 600 is used for the general data processing on the information recording/reproducing apparatus 300, as a buffer area for the record/reproduction data, an area used as an intermediate buffer upon converting into the data which can be used in the recording/reproducing of a signal, or the like. For example, the external RAM 600 is provided with: a ROM area in which a program for performing an operation as a recorder is stored; a RAM area in which variables or parameters required for a program operation and a buffer used in the compression/decompression of video data are stored; and a non-volatile RAM area backed up with an internal battery or the like in order to maintain the information required for timer setting and the variables or parameters for a power failure.

As a result, upon reproducing the OPC pattern in the OPC processing, it is possible to reproduce the OPC pattern on the basis of the wobble signal of the groove tracks GT on the optical disc 100 under the control of the system controller 400. Thus, it is possible to determine the optimum recording laser power.

Next, with reference to FIG. 11, the operation in the normal case of recording and reproducing of the information recording/reproducing apparatus 300 in the embodiment will be explained in detail.

After the optimum recording laser power is determined, in the normal case of recording, the shift switch in the ODC 360 is changed from the OPC pattern generator 340 side to the modulator side, under the control of the system controller 400. The record data is modulated on the modulator, and a signal for writing the data is outputted to the LD driver 320. Then, the optical pickup 310 is moved to the recording area, and the recording pits according to the record data are formed onto the track with the laser beam LB controlled to have the optimum recording laser power.

Moreover, in the normal case of reproducing the record data recorded in this manner, the optical pickup 310 is moved to the recording area under the control of the system controller 400, and the reproduction RF signal corresponding to the recording pits is detected, by which the record data corresponding to the recording pits is reproduced. Namely, the analog front end 311 generates the reproduction RF signal whose signal level changes according to pit rows formed on the optical disc 100 by the result of received laser light of the optical pickup 310, and outputs it to the RF detector 334. The reproduction RF signal is expressed by adding all the results of received laser light of light-receiving elements which receive the reflect light of a main beam. The reproduction RF signal is stored into the external RAM 600 through the memory controller 335 under the control of the ODC 360 and the system controller 400. Alternatively, it is outputted to the backend in real time.

As explained with reference to FIG. 7 to FIG. 11, in the embodiment, the OPC processing in the PCA and the recording and reproducing of the record data in the recording area are performed. Upon recording and reproducing the OPC pattern in the OPC processing, it is possible to specify the recording and reproducing start positions by using the ADIP word, which is the conventional data management unit of the pre-format address information, in combination with the slot unit by which a finer or detailed position can be specified. Thus, it is possible to adjust and match the timing between the recording and the reproducing of the OPC pattern, with the wobble signal as a reference. Thus, it is possible to record and reproduce the OPC pattern, by using the slot unit smaller than the data management unit of the address in the recording area, i.e. the cluster unit or the sector unit, namely by using the slot unit which length is N times as long as one cycle of the wobble signal (N: natural number), as a reference. Thus, it is possible to perform the OPC processing more times more highly accurately in the PCA having a certain size.

Incidentally, in the above-described embodiments, a recorder or a player associated with the write-once optical disc 100 is explained as one example of the information recording/reproducing apparatus. However, the present invention is not limited to such a write-once optical disc, and a recorder or a player for it. The present invention can be applied to other various information recording media for high density recording or high transfer rate; and a recorder or a player for the media.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-207116 filed on Aug. 11, 2003 including the specification, claims, drawings and summary is incorporated herein by reference in its entirety.

What is claimed is:

1. An information recording apparatus for recording record data onto an information recording medium which comprises wobbled tracks and on which pre-format address information is recorded, said information recording apparatus comprising:

an optical pickup device for irradiating a laser beam onto the tracks and receiving a reflected light thereof;

a detecting device for detecting a push-pull signal on the basis of an output of said optical pickup device;

a timing generating device for generating a timing signal by detecting the pre-format address information and by detecting a slot unit smaller than a data management unit of the pre-format address information on the basis of a cycle of the push-pull signal; and an optimum-laser-power-detecting device for detecting an optimum recording laser power by recording or reproducing a test signal on the tracks while changing a recording laser power on the basis of the timing signal.

2. The information recording apparatus according to claim 1, wherein the pre-format address information is an ADIP word unit, and the slot unit is N times as long as one cycle of a wobble signal smaller than the ADIP word (N: natural number).

3. An optimum recording laser power detecting method of detecting an optimum recording laser power by recording a test signal onto an information recording medium which comprises wobbled tracks and on which pre-format address information is recorded, said optimum recording laser power detecting method comprising:

a light irradiating/receiving process of irradiating a laser beam onto the tracks and receiving a reflected light thereof;

a detecting process of detecting a push-pull signal on the basis of an output of said light irradiating/receiving process;

a timing generating process of generating a timing signal by detecting the pre-format address information and by detecting a slot unit smaller than a data management unit of the pre-format address information on the basis of a cycle of the push-pull signal; and an optimum-laser-power-detecting process of detecting an optimum recording laser power by recording or reproducing a test signal on the tracks while changing a recording laser power on the basis of the timing signal.

* * * * *